(12) United States Patent
Matsuura et al.

(10) Patent No.: US 6,874,922 B2
(45) Date of Patent: Apr. 5, 2005

(54) ILLUMINATION DEVICE

(75) Inventors: Yoshihiro Matsuura, Aichi (JP); Tadanobu Iwasa, Aichi (JP); Akihiro Misawa, Aichi (JP); Yasumasa Tatewaki, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/317,125

(22) Filed: Dec. 12, 2002

(65) Prior Publication Data
US 2003/0128549 A1 Jul. 10, 2003

(30) Foreign Application Priority Data

Dec. 13, 2001 (JP) .................................... P2001-380519
Jun. 7, 2002 (JP) .................................... P2002-166442

(51) Int. Cl.[7] .............................. G09F 7/00; B60Q 1/56
(52) U.S. Cl. .................. 362/497; 362/555; 362/558; 362/559; 362/31; 40/204; 40/205
(58) Field of Search ................................. 362/497, 511, 362/555, 559, 800, 235, 249, 812, 31, 558; 40/205, 574

(56) References Cited

U.S. PATENT DOCUMENTS

| | | | | |
|---|---|---|---|---|
| 1,364,916 A | * | 1/1921 | Carse | 40/546 |
| 1,816,220 A | * | 7/1931 | Hotchner | 40/546 |
| 5,101,325 A | * | 3/1992 | Davenport et al. | 362/31 |
| 5,150,960 A | * | 9/1992 | Redick | 362/497 |
| 5,786,665 A | * | 7/1998 | Ohtsuki et al. | 313/512 |
| 5,947,578 A | * | 9/1999 | Ayres | 362/31 |
| 6,239,851 B1 | * | 5/2001 | Hatazawa et al. | 349/62 |
| 6,533,445 B1 | * | 3/2003 | Rogers | 362/540 |

FOREIGN PATENT DOCUMENTS

| | | |
|---|---|---|
| JP | 05-181134 | 7/1993 |
| JP | 10-119669 | 5/1998 |
| JP | 10-129344 | 5/1998 |
| JP | 2000-313279 | 11/2000 |

* cited by examiner

Primary Examiner—Thomas M. Sember
(74) Attorney, Agent, or Firm—McGinn & Gibb, PLLC

(57) ABSTRACT

The illumination device comprises at least one light source, and a light pipe positioned at the front side of a license plate, and a light diffusing means. A light of the light sources is led, the light pipe emitting a leading light from the surface of the license plate face. The light emitted from the observed face is diffused by the light diffusing means. The light diffusing means is provided with, rugged portions of an observed face opposite to a light emitting face, or, a light diffusing layer composed of two or more kinds of light transmitting materials, refractive indexes of which are different each other, on the observing face, and a light led from a light leading face is reflected and diffused on the light diffusing layer.

35 Claims, 5 Drawing Sheets

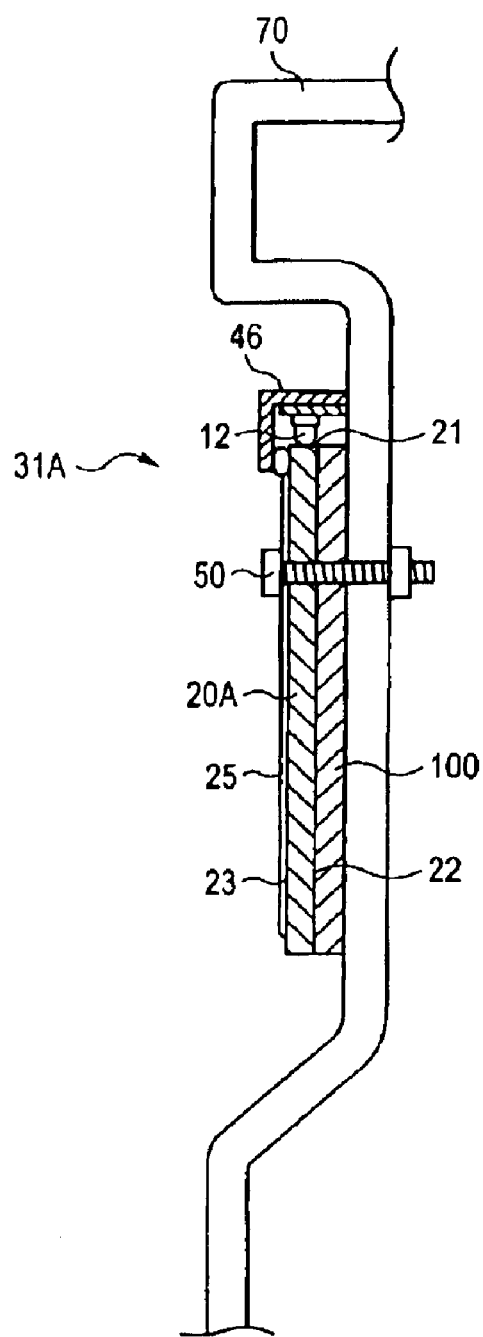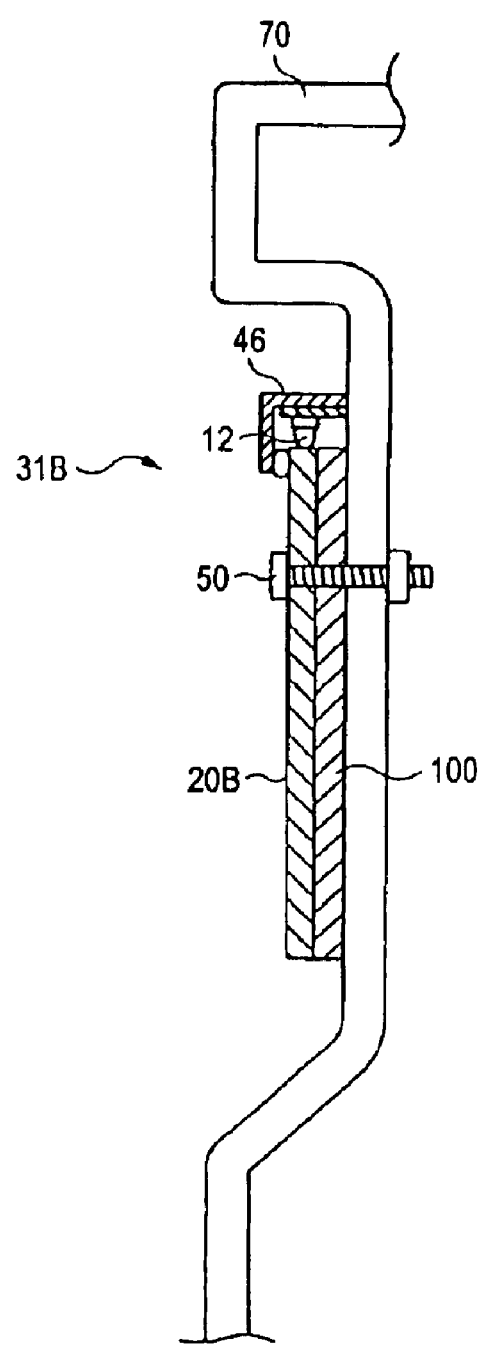

ILLUMINATION DEVICE

The present application is based on Japanese Patent Applications Nos. 2001-380519 and 2002-166442, the entire contents of which are incorporated herein by reference.

BACKGROUND OF THE INVENTION

1. Field of the Invention

The present invention relates to a front light type lighting device adapted to a license plate part of a vehicle, or lightening of many kinds of liquid crystal displays etc. and particularly to an illumination device for the license plate.

2. Related Art

As methods for heightening visibility of a car license plate, there are a method which irradiates light of bulbs positioned above or below the license plate to the surface of the license plate, and a method of using the license plate of a letter lighting system. As to the license plate of the letter lighting system, many improvements are proposed in Japanese Patent Publication Nos. JP H10-129344A, JP 2000-313279A and JP H10-119669A.

Since the light of the bulb employed in the former method is low in directivity, even if the bulb is installed, for example, in opposition to the license plate, some parts of the light emitted from the bulb go to other directions than the license plate. Such lights are not used to illumination of the license plate, besides cause to decrease confirmation of the license plate, and further lower a design property in the portion of the license plate. From the designing viewpoint, it is not desirable that the bulb itself is observed from the outside. Taking the above mentioned into consideration, the surroundings of the bulb other than the side of the license plate are coated with a garnish. On the other hand, for the light from the bulb being easy to irradiate the surface, it is necessary to incline the license plate with respect to the attaching face. In such prior practices, the surroundings of the light sources are coated with the garnish, and the license plate is inclined. As a result, the part of the license plate is inevitably thick along a full length of the car.

On the other hand, also in the license plate of the letter lighting system, it is necessary to secure a space for disposing back lights at the inside of the license plate, and as a whole, an apparatus becomes thick. In addition, owing to necessity of using a specially processed license plate, ordinarily used license plates cannot be utilized and are lack in general purposes. Further, a structure is complicated and high in production cost.

Meanwhile, as for the lighting devices other than the license plate lighting devices, recently, as a lighting way for liquid crystal monitors such as PC (personal computer) or mobile information terminals, a back light system has in general been used. In the back light system, the lighting is practiced by a light from the light guide member installed at a rear side of an illumination object (e.g., liquid crystal). The light guide member for the back light is performed at the back face with a printing or coating in white, or pasted with a reflecting sheet for uniformalizing a light radiated from a front side.

On the other hand, in use of some parts, there has been a practice where the light guide member is disposed at the front face side (an observing face) of the illumination object for lighting by the light radiated from the back face of the light guide member, that is, a practice of the front light. Since this practice interposes the light guide member between an observer and the illumination object, high transparency is demanded to the light guide member itself. Accordingly, the light guide member performed with the white-printing on the upper surface cannot be used like the back light system.

SUMMARY OF THE INVENTION

In view of the above mentioned problems, the invention has been built, and it is accordingly an object of the invention to offer an illumination device for license plate of an simple structure enabling to compose the license plate to be thin type (compact), another object of the invention to offer an illumination device for general purpose application, and a further object of the invention to offer an illumination device enabling to efficiently heighten visibility of the license plate.

For accomplishing at least one of the above mentioned objects, the invention is structured as follows. That is, an illumination device adapted for a license plate, comprising:

at least one light source;

a light pipe positioned at a front side of the license plate and including a light inlet face for introducing light into the light pipe from the light source, a license plate face for emitting light to the license plate, and an observing face provided at a side opposite to the license plate face;

a light diffusing means provided on a side of the observing face with respect to the license plate;

wherein light from the light sources is diffused at the light diffusing means and led to the license plate so as to emit through the license plate face.

In the thus composed illumination device, the light emitted from the light sources is at first introduced into a light pipe, and subsequently the led light is radiated from a surface of the license plate side of the light pipe. The radiated light is irradiated on the surface of the license plate and heightens visibility of letters and numerals on the surface of the license plate.

The light pipe is disposed at the front side of the license plate, and lightens the surface of the license plate by using the light radiated from the surface of the light pipe, and therefore it is not necessary to tilt the license plate as conventionally taking irradiation efficiency of the light from the light source. Accordingly, it is possible to avoid the portion of the license plate from thickening in company of tilting the license plate, in other words, accomplish thinning of the portion of the license plate. Structuring of the portion of the license plate to be compact or thin displays an effect of heightening degree of freedom in designing plan concerned with the portion of the license plate.

Further, the illumination device of the invention may be applied to general license plates, that is, not necessitating an especial license plate such as conventional letter lighting system, applicability of the general purpose is high, and besides the structure of the illumination device is made simple.

Still further, the light of the light sources is converted into a face-like light by passing through the light pipe, and since this face-like light is used for lightening the surface of the license plate, the lighting effect is made high. This fact means that the portion of the license plate having a high design property may be composed. Accordingly, depending on the illumination device of the invention, in addition to the high visibility, the portion of the license plate having an excellent design property.

In the above lighting device having the light guide member for the front light, uniformed light can be radiated by forming fine grooves in a surface of an observing face side of the light guide member so as to accelerate light diffusion in this surface.

Here, the light guide member using the grooves can expect good diffusion effect of light, while taking outdoor use of illumination for the car license plate into consideration, it has a potential case of reducing transparency of the light guide member by gathering dusts in the grooves of the surface of the light guide member. Further, depending on configurations of the grooves to be formed, the groove itself probably blocks the transparency of the light guide member. For forming the fine grooves, the surface must be processed under a condition controlled at high degree, bringing about a problem increasing a processing cost.

The front light system is demanded to avoid glare (reflection) by an injecting light from the outside into the observing face of the light guide member.

The invention further offers to an illumination device wherein the light diffusing means is constituted by a light diffusing layer formed on the observing face and composed of two or more kinds of light transmitting materials, refractive indexes of which are different each other.

In accordance with such a structure, the light diffusing layer comprising the light transmitting material is independently prepared on the observing face of the light pipe. Since it is thereby possible to prevent the surface of the light pipe from inevitably accompanying ruggedness like grooves, such as stains are less to adhere the surface of the light guide member, and there is provided a further advantage that its facility may be maintained for a long time. Moreover, the light diffusing layer is formed by a comparatively easy method as printing or coating, and a production cost of the light guide member may be lowered.

On the other hand, the light diffusing layer formed on the surface of the light pipe is composed of two or more kinds of light transmitting materials having refractive indexes being different each other, and so the transparency is high, and at the same time, owing to difference of the refractive indexes of the composing elements, good reflection and diffusion of the light maybe effected. Accordingly, the light guide member is possible to emit the uniform light from the light emitting face, while securing the transparency necessary for the front light.

Besides, a matting effect is displayed by forming the light diffusing layer, and appearance of glare may be avoided or reduced from the surface of the observing face of the light pipe.

(Light Source)

As the light sources, LEDs, bulbs, a fluorescent lamp, or a cold cathode tube may be used. Among them, preferably the LED is employed.

Being small in electric consumption power and in heating value, and being long life, the LED is the light source suited to continuously lighting for a long time. Further, being a small size, a space for the light source is sufficient to be small, so that it is possible to make the portion of the license plate small sized and thin. Thereby, such a subsidiary effect may be exhibited which heightens the degree of freedom in the design plan of the portion of the license plate. In company therewith, a handling property of the illumination device is also improved. The LEO is strong to vibration or shock, and so it has a merit enabling to compose the illumination device of high reliability.

Types of the LED is not especially limited, and various kinds of a round type or a tip type may be employed.

Luminous colors of the adopted light source are not especially limited, either, and lights in visible ranges such as white, red, orange, green, or blue may be employed. A desirable light source emits a white light, because if employing the light source emitting the white light, it is possible to compose the license plate such that numerals, letters, figures and a background shown in the license plate are observed (viewed) with original colors. On the other hand, if the light sources other than the white are used, it is possible to change the design of the illumination object or heighten the designing property by adding colors to the illumination object.

The light sources emitting lights from an ultraviolet range may be also used. In this case, it is possible to cooperate a fluorescent substance fluorescing by receiving the lights from the ultraviolet range. Incidentally, the light source enabling to fluoresce the lights of the visible range and the ultraviolet range may be employed.

For example, a layer including the fluorescent substance may be installed to a later mentioned surface of the light pipe (a surface to which the light is guided from the light source or a surface of the license plate side). The layer including the fluorescent substance can be formed by printing or coating an ink or a paint containing the fluorescent substance, or pasting a sheet containing the fluorescent substance. Also, the fluorescent substance can be contained in a later mentioned light pipe. In such a structure, fluorescence arises in the light pipe, and the license plate is lightened by radiating the fluorescence from the surface of the light pipe. For containing the fluorescent substance into the light pipe, it is preferable to especially use an organic fluorescent substance, because if using the organic fluorescent substance, transparency of the light pipe can be maintained, and a clear-feeling lighting effect can be provided.

On the other hand, the fluorescent substance is not contained in the planar lighting unit side, but can be also contained in the license plate applied with the illumination device of the invention. For example, it is possible to form display parts (letters or numerals) of the license plate by use of the paint or the ink containing the fluorescent substance, or independently install a layer containing the fluorescent substance on the surface of the display parts. In this structure, the light of the ultraviolet range emitted from the light sources passes through the light pipe and irradiates the surface of the license plate so as to excite the fluorescent substance of the display part. As a result, the display part is shown by the fluorescence.

Kinds of the fluorescent substances are not especially limited, irrespective of organic and inorganic groups. If using the organic fluorescent substance, the light of the clear-feeling fluorescent color can be provided. In contrast, using the inorganic fluorescent substance, the light of a matting fluorescent color can be provided. For example, other than the fluorescent substance having the fluorescent color of the red, the green or the blue being the three primary colors of the light, the fluorescent substance fluorescing intermediate colors thereof can be used. A plurality of fluorescent substances maybe used in combination, for example, a red group fluorescent substance, a green group fluorescent substance, and a blue group fluorescent substance may be used in mixture.

The light sources of the invention may be composed by use of a plurality of LEDs or bulbs. In this case, the same kind of plural light sources or a combination of light sources of different luminous color may be also available. By using the plural light sources, it is possible to obtain an effect of lighting of various luminous colors through intensity of lighting or colors of mixed lights. The number of using the light sources are determined by synthetically considering brightness of each light source, dimensions of the light pipe, or demanded illumination. As an example of the plural light sources, for example, the three kinds of the red based LED, the green based LED and the blue based LED are used to obtain the white color. In this case, if controlling the luminous condition and amount of each LED, a light of a desired color may be provided.

The light sources are disposed at a position enabling to lead the light to a later mentioned light pipe. The light sources are desirably disposed in opposition to the end face of the light pipe, in other words, desirably a terminal of the light pipe is made a face for leading the light. In such a manner, the led light preferably leads the light within the light pipe, and as a result, it is possible to irradiate the light from a wider range of the surface of the light pipe at the side of the license plate with less irregular illumination. For example, one or plural light sources may be arranged in opposition to an upper end face, a lower end face, a left end face and/or a right end face.

For instance, it is desirable to employ an embodiment of the light sources which are linearly arranged under the condition where a plurality of LEDs are in opposition to one end face of the light pipe. This embodiment has a merit of simplifying a composition of a circuit for lightening the respective LEDs.

Herein, in case the quantity of light of the light sources is insufficient, or a good light leading actuation is not provided, the light in the light pipe has probably irregular distribution. For example, the quantity of light declines in a range far from the light sources, and consequently the illumination might be irregular in the light radiated from the surface of the light pipe. In such a case, the light sources are preferably arranged such that the light is led from both of upper and lower or left and right ends of the light pipe. For example, the LEDs in one row are arranged in opposition to the upper end face of the light pipe, and similarly, the LEDs in one row are arranged in opposition to the lower end face of the light pipe. Further, the LEDs are arranged respectively by one row in opposition to the left and right end faces of the light pipe. In addition, the LEDs may be arranged in the four sides to oppose to the respective upper, lower, left and right end faces, or may be arranged in the three sides to oppose to the left-right end faces and the upper end face, or the left-right end faces and the lower end face.

From the viewpoints of the light leading efficiency and of making the apparatus compact, desirably the light sources are disposed nearly to the light pipe.

(Light Pipe)

The light pipe comprises a plate-like light leading substance, and is a member to be positioned at the front face side of the license plate.

Such a light pipe is used which has a plane-viewing area enabling to cover the whole display face of the license plate. For composing the illumination device to be compact, it is preferable to use the light pipe having a plane-viewing shape almost the same as or somewhat larger than the plane-viewing shape of the license plate.

As far as the light pipe sufficiently works to lead the light from the light source and irradiates the led light to the license plate, it is preferable to use the light pipe as thin as possible, for example, 1 to 15 mm thickness. Being thinner than this, a mechanical strength is not sufficiently provided, and being thicker than this, the portion of the license plate is thick to increase production cost. The light pipe is used, which is preferably 2 to 10 mm in thickness, more preferably 3 to 5 mm.

The light pipe has the light inlet face for leading the light from the light sources, the light emitting face for emitting the led light to an outside, and the observing face formed in opposition to the light emitting face. For example, the light pipe shaped in plane (hexahedron) is used to render one set of faces having maximum areas to be the light emitting face and the observing face, and render any of other faces (end faces) to be the light inlet face. In this case, two or more end faces may be made the light inlet faces.

The shape of the light pipe is not limited to the plane, but such shapes may be adopted where the plane is a base and is rugged partially therein, or a part or the whole of the light inlet face, the light reflecting layer and/or the observing face are curved. Not limiting to the plane, for example, a bar shape is sufficient.

A light reflecting layer is preferably formed on a face other than the light inlet face, the light emitting face, and the observing face in order to efficiently emit the light from the light emitting face by preventing light leakage from this face. If providing the light reflecting layer, the light is thereby reflected as well as diffused, and the light diffusion can be accelerated in the light pipe, and more uniform light can be emitted from the light emitting face.

When using the illumination device of the invention (under a condition of attaching it to the license plate), the light pipe preferably approaches the license plate, because the license plate can be made thinner. For example, the illumination device is preferably composed such that the light pipe is, at use, closed to the license plate, provided that a layer may be interposed between the light pipe and the license plate for dispersing the light. For example, the light pipe may be used which is formed with a layer including a light diffusion material on a face opposing to the license plate. The layer including the light diffusion material may be formed by pasting a sheet dispersing the light diffusion material or coating a resin containing the light diffusion material.

It is preferable to form rugged portions on the surface of the license plate of the light pipe or on the surface of the light pipe at the opposite side of the license plate. The rugged portions may be formed on both surfaces. By the rugged portions, it is possible to reflect the light of the light sources guided in the light pipe, and accelerate irregular reflections and diffusion of the light in the light pipe. The led light can be thereby efficiently radiated outside from the surface of the light pipe at the side of the license plate, so that the surface of the license plate can be lightened. Further, a face-like light with less irregular light intensity can be radiated from the surface of the light pipe of the license plate side, thereby enabling to heighten the lighting effect and improve the design property of the portion of the license plate.

The ruggedness herein includes groove shapes such as a triangular groove, a square groove, a circular groove or a pit shape. A plurality of different rugged shapes maybe combined, continuously, discontinuously formed in dot, otherwise formed regularly or at random.

The rugged portion may be formed by cutting off parts of the surface of the light pipe by use of an acicular or saw teeth-like treating tools, or carrying out a cutting or polishing treatment on the surface of the light pipe. Besides, the rugged portion may be formed depending on production of the light pipe by die-forming for desired rugged portions.

Preferably, the rugged portion as mentioned above is provided on the surface of the light pipe at the opposite side of the license plate. In such a manner, the light led in the light pipe is caused with irregular reflection or diffusion on the surface, and may be efficiently radiated from the surface of the light pipe at the side of the license plate. Accordingly, the license plate is lightened on the surface. By the way, since the surface of the light pipe at the opposite side of the license plate is directly observed from the outside, it is desirable for forming the ruggedness on the surface to employ the ruggedness having a shape and dimensions such that the ruggedness is recognized and the design property in the portion of the license plate is not lowered.

For radiating the light from the surface of the light pipe at the side of the license plate under a condition of less luminous irregularity, preferably the rugged portion as mentioned above is formed allover the surface of the light pipe at the opposite side of the license plate. The ruggedness on the surface of the light pipe is preferably formed so that density of the ruggedness becomes higher as the range separating from the surface to which the light of the light source is led. In this way, in the range where the quantity of light reaching this surface reduces, the irregular reflection and diffusion of the light occur more efficiently, and as a result, the luminous irregularity of the light radiated from the surface of the light pipe at the side of the license plate is more lightened. The rugged density may be varied continuously or stepwise.

When employing the light pipe having the larger plane-viewed shape than that of the license plate, it is sufficient that a range formed with no ruggedness is formed in a part (e.g., an end part).

The light diffusing layer may be formed on the observing face of the light pipe. The light diffusing layer is composed of two or more kinds of light transmitting materials, refractive indexes of which are different each other. Specifically, the light diffusing layer is formed with a material where one or more kinds of particles are contained in a basic material of the light transmission, the particles being composed of material having the refractive index different from that of the basic material. As the basic material herein, a material having high light transmittance is suitably used. For example, epoxy resin, acrylic resin, silicone resin, or polycarbonate resin are employed. As materials for the basic material, two kinds or more of materials are used. On the other hand, as materials of particles to be mixed in the basic material, if being high in the light transmittance and having the refractive index different from that of the basic material, no especial limitation is provided. For example, the acrylic resin or the glass may be used. Sizes (particle diameter) of particles are not limited, but if being too large, the particle is directly seen by naked eyes, and a surface design property of the light guide member might be decreased. Therefore, desirably the particle diameter is smaller than thickness of the light diffusing layer. As more specific, for example, average diameter is 3 to 20 $\mu$m, preferably 6 to 12 $\mu$m.

Rates of containing particles in the light diffusing layer are determined by taking into consideration the light transmittance of the necessary light diffusing layer and particle dispersion and coating property, the respective light transmittances of the basic material and the particle, and the degree of necessary effect of glare prevention, and for example, the basic material: the particle is, by weight standard, 100:1 to 100:50, preferably 100:10 to 100:40.

Similarly, the thickness of the light diffusing layer is determined by considering the light transmittance of the necessary light diffusing layer and average diameters of particles contained in the light diffusing layer, and is, e.g., 1 to 50 $\mu$m, preferably 5 to 30 $\mu$m, and more preferably 10 to 20 $\mu$m. The thickness of the light diffusing layer is desirably larger than the average diameter of the particles contained therein. In such a manner, the particles are made easy to be buried in the light diffusing layer, and the surface of the light diffusing layer is made smooth. Preferably, the thickness of the light diffusing layer is smaller than two times of the average particle diameter. The relation between the thickness (t) of the light diffusing layer and the average particle diameter (r) is expressed as follows.

$$r<t<2r.$$

By defining diameter, as above mentioned, the relation between the thickness of the light diffusing layer and the average particle, the particles in the light diffusing layer are put in order of lateral arrangement by one drop by one drop, and in comparison with a case of plural particles being formed in multi-steps, irregular reflections in the light diffusing layer are suppressed, resulting in the efficient light emission from the light emitting face. In other words, a higher bright light can be effected.

The light diffusing layer is formed by a process such as printing, and the thickness is almost even. Further, it is possible to adopt the light diffusing layer which increases continuously or stepwise as the thickness goes farther from the light inlet face of the light pipe. The quantity of light reaching the light diffusing layer decreases as the thickness goes farther from the light inlet face, and in company therewith it is estimated that the light distribution is caused to be irregular, but if adopting the light diffusing layer as mentioned above, in a range where the more insufficient the quantity of light reaching the light diffusing layer, the reflection and the diffusion can be strengthened, whereby the light distribution can be uniformalized in the light pipe. For the same purpose as this, in case the light diffusing layer is composed of the basic material and the particles as mentioned above, it is possible that the rate of containing the particles becomes higher continuously or stepwise as the thickness goes farther from the light inlet face.

For the purpose of adjusting viscosity of a material forming the light diffusing layer and accelerating good dispersion of the particles in the basic material, silica may be added to the light diffusing layer. For example, when adding silica, the diffusing effect of the light can be obtained in addition to the above effect, that is, the reflection and the diffusion of the light diffusing layer can be strengthened.

In the light guide member or the illumination device of the invention, the light transmittance is adjusted to be, e.g., 70 to 95% for securing the transparency demanded as the light guide member for the front light, and effectively suppressing appearance of the glare in the surface of the light guide member. Preferably, the light transmittance is adjusted to be 80 to 90%. If the light transmittance of the light guide member is in such range, the glare can be effectively avoided from appearing while enough securing the transparency. The light transmittance can be appropriately adjusted according to kind and thickness of material of the light pipe to be used, and the composition (material, thickness and others) of the light diffusing layer.

For emitting the light from the light emitting face under a condition without irregular illumination, it is desirable to form the light diffusing layer substantially allover the observing face of the light pipe. The light diffusing layer may be formed on a part of the observing face of the light pipe for forming a predetermined pattern in the plane-viewing. The pattern herein may be irregular, but preferably regular patterns are adopted for performing the uniform reflection and diffusion of the light over the light diffusing layer, so that the light of less irregular illumination is emitted thereby. As the regular pattern, exemplified are patterns of desired dots being shaped in matrix, slit-like patterns, or lattice-like patterns. In this case, a rate of an area of the light diffusing layer occupying an area of the observing face is 30 to 90%, preferably 50 to 80%. By providing the light diffusing layer partially, not allover, such a merit can be obtained which prevents the observing face from being seen in white when the light injects to the observing face from the outside.

The light diffusing layer is performed on the surface with the coating of the light transmitting material, thereby enabling to protect the light diffusing layer from stains or scratches. Or, if using an ultraviolet absorbing material to the coating, the light diffusing layer can be protected from deterioration or damages owing to the ultraviolet rays.

When using the light guide member or the illumination device of the invention, desirably the light guide member is approached to the light object, because a higher lighting effect is available and in case the light guide member is fixed to use, small installing space is enough. For instance, the light guide member of the invention can be used under a condition where the light emitting face of the light pipe is close to the light object. Between the light emitting face of the light pipe and the light object, there may be interposed a layer for accelerating the light diffusion. The layer containing the light diffusing material is formed by pasting a sheet distributed with the light diffusing material to the surfaces of the light emitting face or the light object, or by coating a resin containing the light diffusing material.

In the observing face of the light pipe, a tapered face may be formed on the light emitting face side as going away from the light sources. The whole observing face of the light pipe may be also tapered. For example, in case the plate-like light pipe is adopted and the light sources are arranged in opposition to the upper end face thereof, the observing face of the light pipe is tapered from the upper end face to the lower end face. When being tapered on the observing face of the light pipe, if the light of the light sources is led, e.g., from the upper end face of the light pipe such that an optical axis of the light from the light source is parallel to the light emitting face of the light pipe, the led light efficiently reaches the observing face of the light pipe, subsequently reaches the light diffusing layer formed on the surface thereof, and causes the efficient reflection and diffusion of the light by the light diffusing layer. Distribution of the light is thereby more uniformalized in the light pipe, and the light with less irregular illumination can be emitted from the light emitting face of the light pipe.

A cover can be furnished to coat over the light sources, the terminal face and the end of the light pipe for preventing the light sources from the outside observation, avoiding the light leaking from the terminal face and the end of the light pipe, and protecting the end part of the light pipe.

Depending on the processing treatment at the terminal face of the light pipe, there is a probable case that a leaking light can be almost ignored. Further, depending on viewing, the light observation from the terminal face (and/or the end part) of the light pipe has an ornamental effect. In addition, the terminal face (and/or the end part) of the light pipe is subjected to a cutting treatment, so that the luminous embodiment may be turned out to produce more ornamental effects. In other words, the light is positively made luminous from the terminal face (and/or the end part) of the light pipe for making use of this effect to additive ornament.

There are cases that the terminal face of the light pipe is not necessarily hidden depending on designs of the light pipe, or rather a bare state is more preferable. In such cases, instead of the cover as mentioned above, these covers may be used which coat only the light source, coat only the light source and parts of the terminal faces (e.g., the upper end face), or coat only the light sources, the parts of the terminal faces (e.g., the upper end face) and the end part continuing thereto.

A material quality of the light pipe is not especially limited, if it has permeability to the light of the light sources. Preferably, the light pipe is made of a transparent material (including colorless and color transparency). Further, the light pipe is desirably composed of a material easy to be processed and excellent in durability. As materials of the light pipe, for example, available are polycarbonate resin, acrylic resin, epoxy resin, or glass.

As the light pipe, a light pipe having a groove for receiving the light sources maybe employed. In such a manner, the light sources and the light pipe are unified as one body to improve sealing property, so that the illumination device having high dust prevention and water proof can be offered. For example, the light pipe is provided with the groove at the end face (upper, lower, or left-right end faces).

The illumination device of the invention is served by attaching to the license plate, to a bumper furnished with the license plate, or the garnish.

The illumination device may be structured integrally with the license plate, and in this case, the illumination device holding the license plate therein is attached to the bumper, or the garnish.

The present invention may be independently embodied not only as an illumination device, but also as a light guide member by itself, or a planar lighting unit by combining the light pipe and at least one light source.

As the light object of the invention, for instance, there may be enumerated license plates of vehicles, liquid monitors such as PC (personal computer), information conveying media such as indoor or outdoor indicating signs or advertisement (advertising plate), and books. These light objects and the light guide member of the invention may be also unified as one body.

BRIEF DESCRIPTION OF THE DRAWINGS

FIG. 8 is a cross sectional view showing the attachment of the illumination device for the license plate.

FIG. 9 is a cross sectional view showing the fifth embodiment of attaching the illumination device 31B of the license plate.

DETAILED DESCRIPTION OF THE PREFERRED EMBODIMENTS (First Embodiment)

Figure 1:
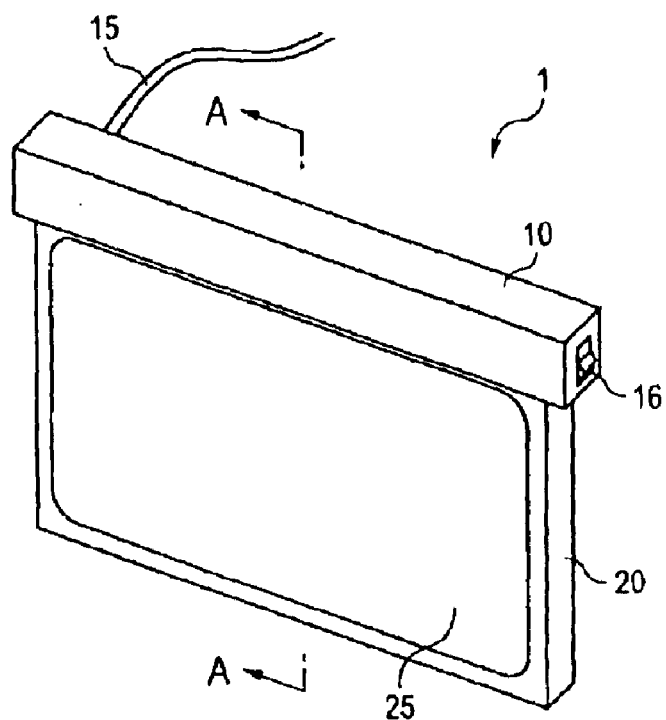
FIG. 1 is a perspective view showing the planar lighting unit as the first embodiment of the invention.
Figure 2:
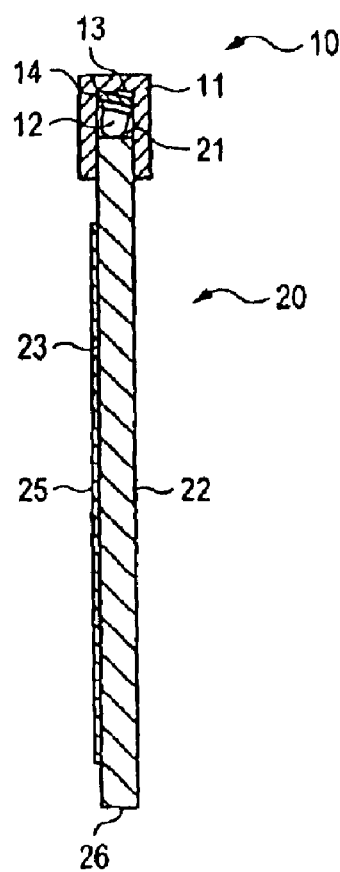
FIG. 2 is a cross sectional view along A—A line of FIG. 1.

The structure of the invention will be explained in more detail by use of the embodiments. FIG. 1 is a perspective view showing the planar lighting unit 1 as one of the embodiments. FIG. 2 is a cross sectional view along A—A line of FIG. 1.

The illumination device is substantially composed of the light source unit 10 and the light pipe 20. The light pipe 20 is shaped in plane of about 4 mm thickness, and a material quality is an acrylic resin. The light diffusing layer 25 as light diffusing means is formed almost allover the observing face (a design face) 23 of the light pipe 20. The light diffusing layer 25 is a layer where acrylic beads having average diameter of about 6 $\mu$m are dispersed in the base material of the acrylic resin, and has thickness of about 12 $\mu$m. The amount of containing the acrylic beads in the light diffusing layer 23 is, by weight standard, 1 to 100 of the base material. Such a light diffusing layer 25 is formed by printing or coating a clear ink containing the acrylic beads of a desired amount in an area forming the light diffusing layer in the observing face 23 of the light pipe 20. Depending on the printing, the light diffusing layer having a desired plane-viewing pattern (e g., dot matrix) can be easily formed.

The upper face of the light pipe 20 is the light inlet face 21, while the back face is the light emitting face 22. The surface of the light emitting face 22 is mirror-treated, while other surfaces of the ends of the light pipe than the light inlet face 21, the light emitting face 22 and the observing face 23 are rough-processed.

The casing 11 of the light source unit 10 is installed at the interior thereof with a seat 13 having an inclined upper face, and a plurality of LEDs 12 are mounted in a row on the base plate 14 fixedly placed on the inclined seat 13 Being disposed as above, the respective LEDs 12 are opposed to the light inlet face 21 of the light pipe 20 under a condition where the optical axes of the LEDs are not parallel to the observing face 23 of the light pipe 20 but are inclined somewhat toward the side of the observing face 23.

For efficiently introducing the light, the respective LEDs 12 are designed to be arranged closely to the light inlet face 21. In this embodiment, as the LEDs 12, the white luminous LEDs of cannonball and white color are used in 8 pieces in total.

On the base plate 14, a protective resistance and a control circuit are mounted other than the LEDs 12, and a wiring pattern is formed on the back face such that the LEDs 12 are connected in series. The LEDs 12 may be connected in parallel.

The light source unit 10 is supplied with electric power via the wiring 15, and is switched ON or OFF by a switch 16 provided in one side of the casing 11.

In the planar lighting unit 1 of the above mentioned structure, each of the LEDs 12 in the light source unit 10 is lightened by operating the switch 16 and the white light is emitted. This white light is led to the light pipe 20 via the light inlet face 21. While leading the light to the light pipe 20, a majority of the led light reaches the light diffusing layer 25 formed on the observing face 23. In the light diffusing layer 25, the injected light is reflected and diffused owing to difference of the refractive indexes between the base material and the acrylic bead, whereby the light is generated in the direction of the light emitting face 22, and finally, the light is radiated through the light emitting face 22.

Herein, by somewhat directing the optical axis of the LED 12 toward the observing face 23, the light from the LED 12 can be progressed positively and efficiently to the side of the observing face 23, whereby the amount of the light leaking from the end 26 of the light pipe 20 can be reduced (that is, the led light can be efficiently used), so that the amount of the light emitted from the light emitting face 22 can be increased. At the same time, the good reflection and diffusing action can be made in the light diffusing layer 25. The light distribution is uniformalized thereby in the light pipe 20, and concurrently the light is efficiently emitted from the light emitting face 22. As a result, the light radiated from the light emitting face 22 is extremely small in the irregular illumination allover and is high in lighting. Thus, in the planar lighting unit 1, it is possible to obtain the face-like light having the uniformed illumination.

By the way, the LEDs 12 can be arranged such that the optical axes cross at right angle with the light inlet face 21, or cross with the light inlet face 21 under a condition where the optical axes incline more or less toward the light emitting face 22.

(Second Embodiment)

Figure 3:
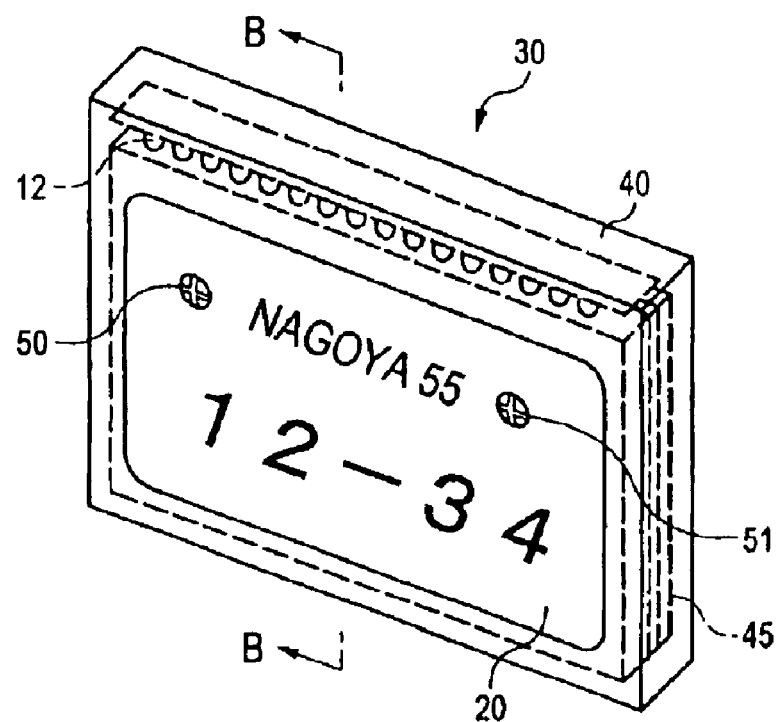
FIG. 3 is a perspective view showing the illumination device for the license plate as the second embodiment of the invention.
Figure 4:
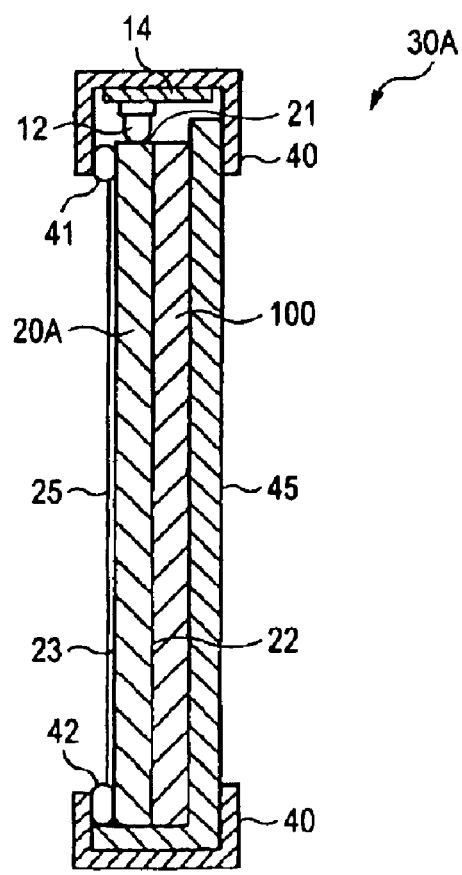
FIG. 4 is a cross sectional view along B—B line of FIG. 3.
Figure 5:
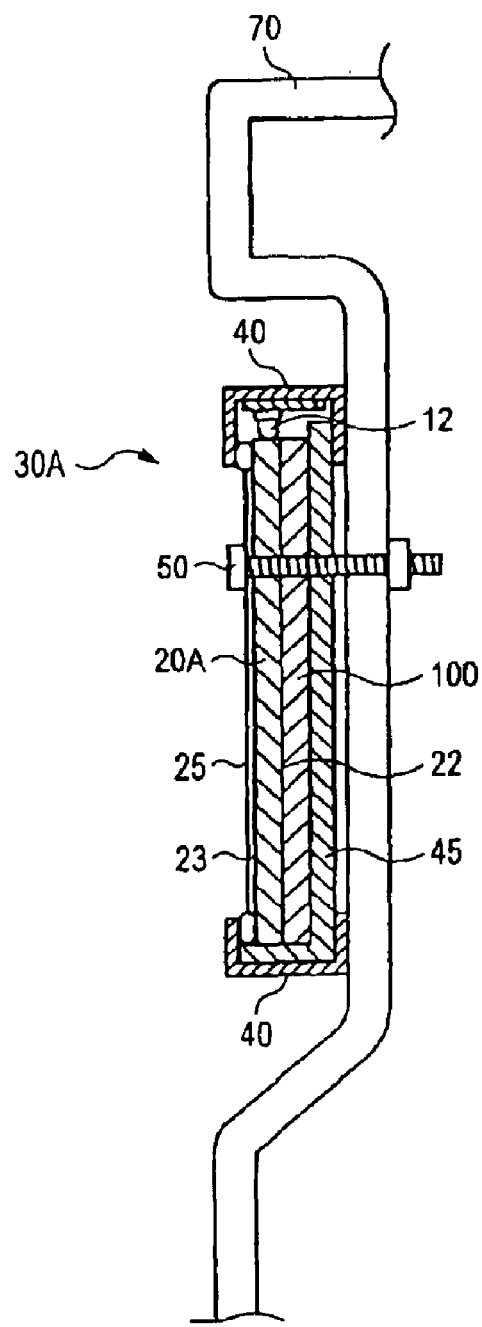
FIG. 5 is a cross sectional view showing the attachment of the illumination device for the license plate.

Next, explanation will be made to the illumination device 30A of the license plate as the second embodiment of the invention. FIG. 3 is a perspective view showing the illumination device 30A. FIG. 4 is a cross sectional view along B—B line of FIG. 3. FIG. 5 is a cross sectional view showing attachment of the illumination device 30A. In each of the drawings, the same members as those of the planar lighting unit 1 will be given the same numerals for omitting explanations therefor.

The illumination device 30A is almost composed of the light pipe 20A, the plural LEDs 12 mounted on the base plate 14, the support plate 45 and the casing 40. In this embodiment, as the LEDs 12, the white luminous LEDs of cannonball and the white color are used in 16 pieces in total. The LEDs 12 are supplied with electric power via a wiring (not shown).

The support plate 45 is a member provided for securing the position of the license plate 100. As showing in FIG. 4, the license plate 100 is placed between the support plate 45 and the light pipe 20A. For attaching the license plate 100 to the bumper or the garnish, screws 50, 51 are used (see FIGS. 3 and 5), and the license plate 100 is held between the light pipe 20A and the support plate 45 to fix the position. The support plate 45 may be installed as one body with later mentioned casings 40.

The casing 40 is a frame-like member made of resin for covering the ends of the light pipe 20A and receiving the base plate 14 and the LEDs 12 at the upper part. The casing 40 may be plate- or coating-treated on the surface (for example, the same color as that of the bumper or the garnish being objects to be attached) The casing 40 may be made of a metallic material. For instance, a metal sheet is processed in frame shape and is coated on the surface to be the casing 40. The sealing is performed (numerals 41, 42) between the casing 40 and the light pipe 20A for purposes of fixing the positions, water proof and dust prevention.

The casing 40 may be composed such that the license plate 100 is inserted as sliding into the casing 40 from the upper, lower, or lateral sides. For instance, the casing 40 is provided on the upper face with an opening for inserting the license plate.

The illumination device 30A receiving the license plate 100 therein is installed and secured to the bumper 70 by the screws 50, 51 (see FIG. 5).

Next, a lighting of the illumination device 30A will be explained. At first, the respective LEDs. 12 are supplied with electric power in cooperation with lighting of car width lamps (position lamps), and the white light is emitted from the light inlet face 21 of the light pipe 20A to the light pipe 20A. While leading the light to the light pipe 20A, the majority of the led light reaches the light diffusing layer 25 formed on the observing face 23. In the light diffusing layer 25, the injected light is reflected and diffused owing to difference of the refractive indexes between the base material and the acrylic bead, whereby the light is generated in the direction of the light emitting face 22, and finally, the light is radiated through the light emitting face 22.

Herein, since the good reflection and diffusing action of the light are displayed in the light diffusing layer 25, the light distribution is uniformalized in the light pipe 20A, and at the same time, the light is efficiently emitted from the light emitting face 22. As a result, the light radiated from the light emitting face 22 is extremely small in the irregular illumination allover and is high in lighting. Accordingly, the license plate 100 is lightened on the surface with the face-like light (the white light) of the high illumination with less irregularity, so that the visibility of letters and numerals shown there are effectively heightened. Since the light pipe 20A has the high transparency, when lighting out, the letters and numerals on the license plate 100 are not obstructed for seeing. Therefore, the license plate part applied with the illumination device 30A of this embodiment has the high visibility at daytimes and night-times.

(Third Embodiment)

Figure 6:
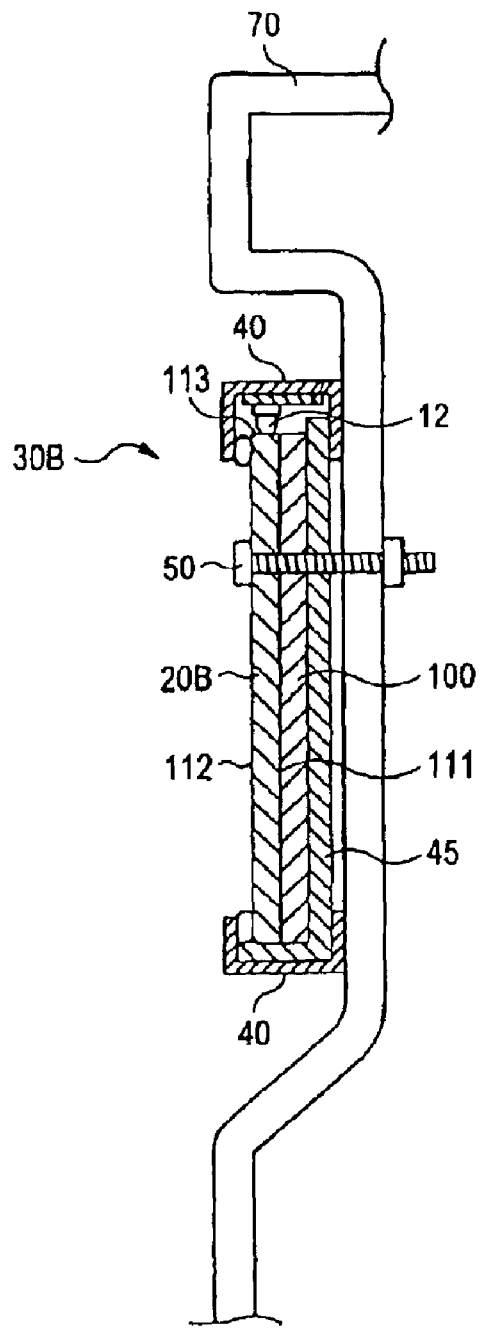
FIG. 6 is a cross sectional view showing the third embodiment of attaching the illumination device 30B of the license plate.

FIG. 6 is a cross sectional view showing an illumination device 30B according to the third embodiment of the invention.

In the third embodiment, the light pipe 20B comprises a plane-like material of the acrylic resin group of about 4 mm thickness, and is almost the same in the plane-viewed shape as the license plate 100. Incidentally, the license plate 100 is not exclusively used to the illumination device 30B, but broadly used in general.

In this embodiment, although light diffusing layer is not provided, substantially triangular grooves continuing in dot in a vertical direction are innumerably formed alternatively so as to constitute light diffusing means in a horizontal direction on the surface 112 of the light pipe at the opposite side to the license plate 100. The innumerable grooves are formed more closely as becoming farther from the upper end face 113. Specifically, at the range nearest to the side of the upper end face 113, the grooves of about 1.77 mm length× about 0.22 mm width×about 0.1 mm depth are formed at about 0.5 mm pitch in the vertical direction, and about 1.47 mm pitch in the lateral direction. On the other hand, in the vicinity of the center of the light pipe 20B, the grooves of about 1.62 mm length×about 0.21 mm width×about 0.08 mm depth are formed at about 0.49 mm pitch in the vertical direction, and about 1.16 mm pitch in the lateral direction. At the range farthest from the side of the upper end face 113, the grooves of about 1.26 mm length×about 0.22 mm width×about 0.06 mm depth are formed at about 0.27 mm pitch in the vertical direction, and about 0.36 mm pitch in the lateral direction. Thus the ranges (or regions) of the face are configured so that the density of the grooves becomes higher as the region is located farther from the upper end face 113.

These grooves may be formed by treating as scratching the surface of the light pipe 112 at the opposite side of the license plate 100 by means of a processing tool having innumerable metal needles on the surface.

By the way, the surface of the light pipe 111 at the side of the license plate 100 is performed with a mirror treatment.

Next, a lighting of the illumination device 30B will be explained. At first, the respective LEDs 12 are supplied with electric current in cooperation with lighting of car width lamps (position lamps), and the white light is emitted from the LEDs 12. The white light is introduced to the light pipe 20B from the upper end face 113 of the light pipe 20B. The light for leading the light pipe 20B is reflected and diffused by the grooves provided on the surface 112 opposite to the license plate 100 of the light pipe 20B. Thereby, a light directing to the surface 111 of the license plate side occurs, and a light radiation is carried out through the surface 111 of the license plate side. Further, by actuation of the grooves, the light diffusion is accelerated at the interior of the light pipe 20B. Since the groove is formed such that the density becomes higher as the range separating from the upper end face 113, the irregular reflection and the diffusion of the light are more efficiently performed as becoming farther from the upper end face 113, and the light distribution is uniformalized at the interior of the light pipe 20B. Therefore, the light radiated from the surface of the light pipe 111 at the side of the license plate 100 is largely reduced in irregularity of the light intensity. As a result, the face-like light of being uniformalized allover the light intensity is radiated from the surface of the light pipe 111 at the side of the license plate 100. Accordingly, the illumination device is lightened on the surface with the face-like light of the less irregular illumination, and the visibility of the letters and numerals displayed there is effectively heightened.

(Fourth Embodiment)

Figure 7:
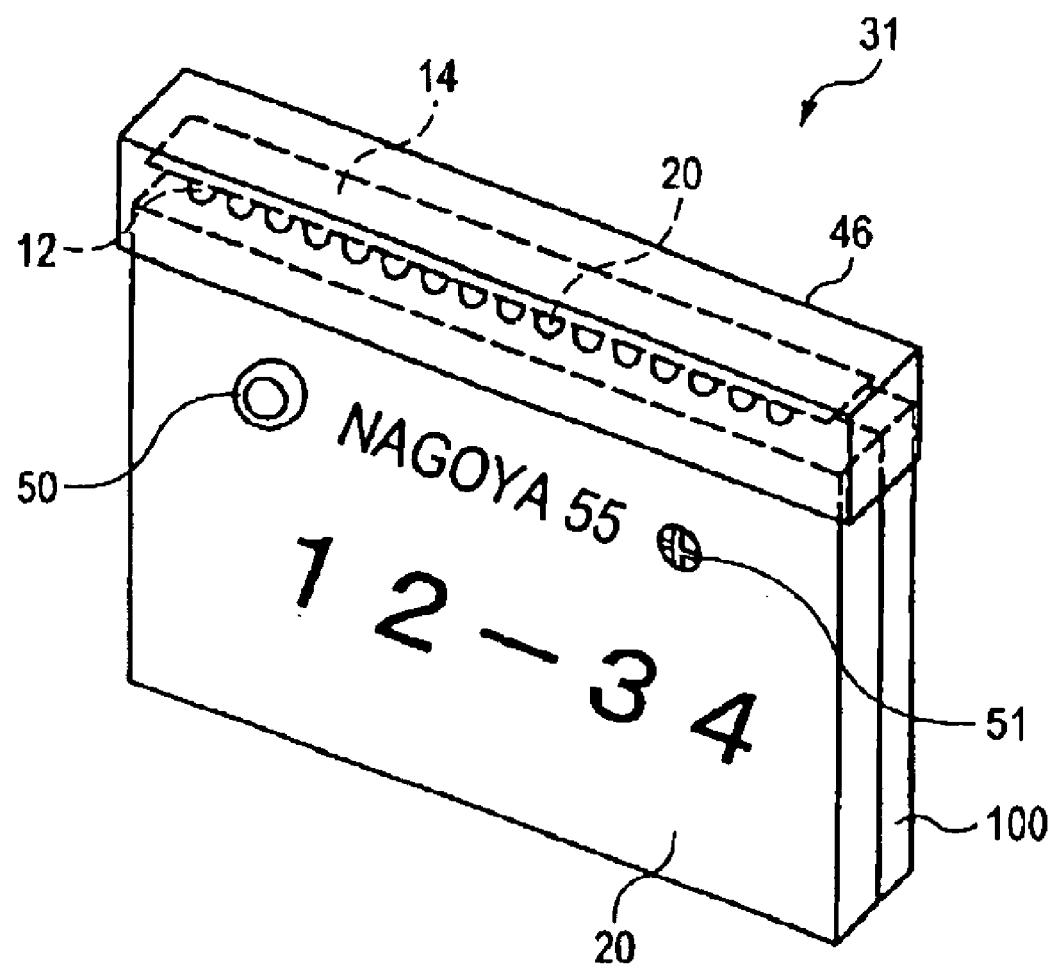
FIG. 7 is a perspective view showing the illumination device for the license plate as the fourth embodiment of the invention.

FIG. 7 is a perspective view showing the illumination device 31A for the license plate as the fourth embodiment of the invention. In the illumination device 31A, the same members as those of the above mentioned illumination device 30A will be given the same numerals for omitting explanations therefor.

In the illumination device 31A, a casing 46 is used which has openings at a lower face side and a rear face side (see FIG. 8). In the casing 46, a plurality of LEDs 12 are supported therein similarly to the above mentioned illumination device 30A, and the respective LEDs 12 are disposed in opposition to the upper end face (the light inlet face 21) of the light pipe 20A.

The illumination device 31A is fixedly installed to the bumper 70 at the same time of attaching to the license plate 100 by use of the screws 50, 51 (see FIG. 8). The screw 50 is sealed with a metal-made cap. As shown in FIG. 8, the license plate 100 is held between the light pipe 20A and the bumper 70. When this illumination device 31A is used to the license plate at the rear part of the vehicle, the light pipe is provided with sealing penetrating holes.

In case of using the illumination device 31A, the license plate 100 is lightened on the surface by the face-like light radiated from the surface of the light pipe 22 at the side of the number plate 100, and the visibility thereof is heightened, and in addition, the light is radiated from the lower end face and the left-right end faces of the light pipe 20A. Namely, these end faces of the light pipe 20A are made luminous for observation. By this emission, the ornamental effect is exhibited and the design property of the portion of the license plate is improved. Thus, in the structure of the illumination device 31A, the light from the LED sources is used for improving the visibility of the number plate and imparting the ornamental property.

(Fifth Embodiment)

FIG. 9 is a sectional view showing the illumination device 31B for the license plate in an attached state as the fifth embodiment of the invention. In the illumination device 31B, a casing 46 is used which has openings at a lower face side and a rear face side. Inside the casing 46, the illumination device 31B is configured as similar to the illumination device 30B of the third embodiment.

By such the structure, the advantage that the design property of the license plate is improved is also obtained in this embodiment as obtained in the illumination device 31A the fourth embodiment.

In the above mentioned illumination devices 1, 30A, 30B, 31A and 31B, the LEDs are used as the light sources, but instead of them, the bulbs and the cold cathode tube may be adopted.

The invention is by no means limited to the explanations of the above mentioned embodiments. So far as not deviating from the description of claims and in a range where those skilled in the art can easily reduce to practice, various modifications are included.

In the invention, the light pipe is disposed to the whole face side of the license plate, so that it is not necessary to incline the license plate, taking the light irradiating efficiency into consideration, and the portion of the license plate can be made very thin. As shown in the embodiments, the illumination device of the invention is not performed with any especial process, and applicable to ordinary license plates with highly general purpose. Further, any especial license plate is not demanded as the existing license plates of the letter lighting system, and the structure is simple. In addition, since the license plate is fixedly secured by ordinarily used screws to the bumper or the garnish, the attaching is of course easy, and the license plate may be used as a post-attached part to the existing cars and is broadly used. Further, since the illumination effect by the face-like light is high, it is possible to efficiently heighten the visibility and the design property of the portion of the license plate.

In the invention, the light diffusing layer is formed on the opposite face (the observing face) to the light emitting face, the layer being composed of two or more kinds of light transmitting materials, refractive indexes of which are different each other, so that the light is efficiently emitted from the light emitting face while securing the transparency required as the light guide member for the front lights. The illumination of the emitted light is uniformalized by efficiently causing the reflection and diffusion of the light. According to the light guide member of the invention, it is possible to obtain the face-like light of high illumination and less irregularity. Further, by forming the light diffusing layer on the observing face of the light guide member, an antiglare effect is available, and at the same time, the design-improving effect is exhibited by the matting-feeling.

The light guide member or the planar lighting unit of the invention is composed to be thin and compact, and the installing space requested at use is enough to be small. Therefore, for example, when using the light guide member or the planar lighting unit of the invention for lightening the portion of the license plate, the portion of the license plate can be composed to be extremely thin. As shown in the embodiments, the light guide member or the planar lighting unit of the invention is not performed with any especial process, and may be applied to general license plates with high general purposes. Further, any especial license plate is not required as existing letter lighting system, and the structure of the invention is simple. In addition, since the license plate is fixedly secured by ordinarily used screws (to the bumper or the garnish), the attaching is of course easy, and may be used as a post-attached part to the existing cars and is broadly used.

The following items will be disclosed.

(10) The illumination device, wherein the light sources are disposed in opposition to the end face of the light pipe, and the tapered face is formed on the surface of the light pipe 111 at the opposite side of the license plate 100 of the light pipe toward the side of the license plate as becoming farther from the end face.

(11) The illumination device, wherein the cover is furnished for coating the light sources, and the terminal ends and end faces of the light pipe.

(12) The illumination device, wherein the cover is furnished for coating the light sources.

(13) The illumination device, wherein the cover is furnished for coating the light sources and parts of the terminal faces of the light pipe.

(14) The illumination device, wherein the cover is furnished for coating the light sources, parts of the terminal faces of the light pipe, and ends continuing thereto.

(15) The illumination device, wherein the plane-viewed shape of the light pipe is substantially the same as that of the license plate.

(20) The lighting method of the license plate, characterized in that the light from the light sources is led to the light pipe disposed at the front side of the license plate, and the led light is radiated from the surface of the portion of the license plate of the light pipe for lightening the surface of the license plate.

(21) The lighting method, characterized in that the light is led from the light sources through the terminal end of the light pipe

(22) The lighting method, wherein the light sources emit the light of the white group, and the illumination is effected by the light of the white group.

(23) The lighting method, wherein the light source comprises the LEDs.

(111) The light guide member, wherein the light pipe is formed at the end faces with the light inlet face.

(112) The light guide member, wherein the light diffusing layer is formed substantially allover the observing face of the light pipe.

(113) The light guide member, wherein the light diffusing layer is formed at one part of the observing face of the light pipe.

(114) The light guide member, wherein the light transmittance in a direction of the light emitting face from the light diffusing layer is 80 to 90%.

(115) The light guide member, wherein the average particle diameter is 3 to 20 $\mu$m.

(116) The light guide member, wherein the average particle diameter is 6 to 12 $\mu$m.

(117) The light guide member, wherein the containing ratio of the basic material:the particle in the light diffusing layer is, by weight standard, 100:1 to 100:50.

(118) The light guide member, wherein the containing ratio of the basic material: the particle in the light diffusing layer is, by weight standard, 100:10 to 100:40.

(119) The light guide member, wherein the containing rate of the particle in the light diffusing layer becomes higher continuously or stepwise as separating from the light inlet face.

(120) The light guide member, wherein the thickness of the light diffusing layer is 1 to 50 $\mu$m.

(121) The light guide member, wherein the thickness of the light diffusing layer is 5 to 30 $\mu$m.

(122) The light guide member, wherein the thickness of the light diffusing layer becomes higher continuously or stepwise as separating from the light inlet face.

(123) The planar lighting unit includes any the above described light guide members and the light sources disposed in opposition to the light inlet face of the light guide member.

(124) The planar lighting unit, wherein the light sources comprise the LEDs.
(125) The planar lighting unit, wherein the light sources comprise a plurality of LEDs, and are linearly arranged under the condition where the plural LEDs are opposed to the light inlet face of the light pipe.
(126) The planar lighting unit, wherein the light sources emit the light of the white group.
(127) The planar lighting unit, wherein the light from the light sources is led such that at least one part of the light directly goes toward the light diffusing layer.
(128) The license plate apparatus, furnished with
the planar lighting unit, and
the license plate installed such that the indication face thereof is opposed to the side of the light emitting face of the planar lighting unit.
(129) The light guide member, wherein the thickness (t) of the light diffusing layer and the average particle diameter (r) are in the relation satisfying r<t<2r.

What is claimed is:

1. An illumination device adapted for a license plate, comprising:
   at least one light source;
   a light pipe positioned at a front side of the license plate and including a light inlet face for introducing light into the light pipe from the light source, a license plate face for emitting light to the license plate, and an observing face provided at a side opposite to the license plate face; and
   light diffusing means provided on a side of the observing face with respect to the license plate,
   wherein light from said at least one light source is diffused at the light diffusing means and led to the license plate so as to emit through the license plate face, and
   wherein said at least one light source comprises an LED.

2. An illumination device as set forth in claim 1, wherein rugged portions are formed on at least one of the license plate face and the observing face.

3. An illumination device as set forth in claim 2, wherein the rugged portions are formed with a plurality of grooves and a density of the grooves in a region becomes higher as the region is located farther from the light inlet face.

4. An illumination device as set forth in claim 1, wherein the light source is positioned in opposition to the end face of the light pipe.

5. An illumination device as set forth in claim 1, wherein the at least one light source comprises a plurality of LEDs, and the plurality of LEDs are linearly arranged under a condition of opposing to a common end face defining the light inlet face the light pipe.

6. An illumination device as set forth in claim 1, wherein the light diffusing means comprises a light diffusing layer formed on the observing face and comprising at least two kinds of light transmitting materials, and
   wherein refractive indexes of at least two of said light transmitting materials are different from each other.

7. An illumination device as set forth in claim 6, wherein the light diffusing layer comprises particles that are contained in a basic material of the light transmission materials, the particles comprising material having a refractive index different from that of the basic material.

8. An illumination device asset forth in claim 7, wherein the particles comprise an acrylic resin.

9. An illumination device as set forth in claim 7, wherein the light diffusing layer is formed by printing.

10. An illumination device as set forth in claim 6, wherein the light diffusing layer is formed in dot matrix on the observing face.

11. An illumination device as set forth in claim 6, wherein a rate of an area of the light diffusing layer occupying an area of the observing face is 30 to 90%.

12. An illumination device as set forth in claim 6, wherein light transmittance in a direction of the light emitting face from the light diffusing layer is 70 to 95%.

13. An illumination device as set forth in claim 6, wherein the light diffusing layer comprises silica.

14. A light guide member comprising:
    a light pipe operable to be positioned at a front side of an illuminating object and comprising a light inlet face for introducing light into the light pipe, a light emitting face for emitting light to the illuminating object, and an observing face provided at a side opposite to the light emitting face; and
    a light diffusing means provided on a side of the observing face with respect to the illuminating object,
    wherein light introduced from the light inlet face is diffused at the light diffusing means and led to the illumination object so as to emit through the illumination object face.

15. An illumination device as set forth in claim 14, wherein rugged portions are formed on at least one of the light emitting face and the observing face.

16. An illumination device as set forth in claim 14, wherein the light diffusing means comprises a light diffusing layer formed on the observing face and comprises at least two kinds of light transmitting materials, and
    wherein refractive indexes of at least two of said light transmitting materials are different from each other.

17. A planar lighting unit, comprising a light guide member as set forth in claim 14 and at least one light source.

18. A planar lighting unit as set forth in claim 17, wherein the light source comprises a white LED.

19. A license plate apparatus comprising:
    a planar lighting unit as set forth in claim 14, and
    a license plate disposed so that an indication face of the license plate is opposed to a side of the light emitting face of the planar lighting unit.

20. An illumination device adapted for a license plate, comprising:
    at least one light source;
    a light pipe disposed at a front side of the license plate and comprising:
        a light inlet face for introducing light into the light pipe from the light source,
        a light emitting face adjacent to the license plate, for emitting light to the license plate, and
        an observing face provided at a side opposite to the light emitting face; and
    a light diffusing layer provided on the observing face,
    wherein light from the at least one light source is diffused at the light diffusing layer and directed through the light emitting face to the license plate.

21. An illumination device as set forth in claim 20, wherein the light diffusing layer comprises at least two kinds of light transmitting material, and
    wherein refractive indexes of at least two of the light transmitting materials are different from each other.

22. An illumination device as set forth in claim 21, wherein the light diffusing layer comprises:
    a light transmitting material; and
    particles in the light transmitting material,
    wherein a refractive index of the light transmitting material is not equal to a refractive index of the particles.

23. An illumination device as set forth in claim 22, wherein the particles comprise an acrylic resin.

24. An illumination device set forth in claim 22, wherein the light diffusing layer comprises a printed light diffusing layer.

25. An illumination device as set forth in claim 21, wherein the light diffusing layer comprises a dot matrix light diffusing layer on the observing face.

26. An illumination device as set forth in claim 21, wherein an area of the light diffusing layer is equal to 30% to 90% of an area of the observing face.

27. An illumination device as set forth in claim 21, wherein light transmittance in a direction of the light emitting face from the light diffusing layer is 70% to 95%.

28. An illumination device as set forth in claim 21, wherein the light diffusing layer comprises silica.

29. An illumination device as set forth in claim 22, wherein a diameter of the particles is smaller than a thickness of the light diffusing layer.

30. An illumination device as set forth in claim 22, wherein an average diameter of the particles is between 3 $\mu$m and 20 $\mu$m.

31. An illumination device as set forth in claim 22, wherein an average diameter of the particles is between 6 $\mu$m and 12 $\mu$m.

32. An illumination device as set forth in claim 22, wherein a thickness of the light diffusing layer satisfies the expression:

$$r < t < 2r$$

wherein r is an average particle diameter, and t is the thickness of the light diffusing layer.

33. A light guide member comprising:
a light pipe operable to be disposed at a front side of an illuminating object and comprising:
   a light inlet face for introducing light into the light pipe,
   a light emitting face for emitting light to the illuminating object, and
   an observing face provided at a side opposite to the light emitting face;
a light diffusing layer provided on the observing face,
wherein light introduced from the light inlet face is diffused at the light diffusing layer and directed through the light emitting face to the illuminating object.

34. An illumination device as set forth in claim 33, wherein the light diffusing layer is disposed on the observing face and comprises at least to kinds of light transmitting materials, and
wherein refractive indexes of at least two of the light transmitting materials are different from each other.

35. A license plate apparatus comprising:
a planar lighting unit comprising:
   a light pipe disposed at a front side of an illuminating object and including a light inlet face that introduces light into the light pipe, a light emitting face that emits light to the illuminating object, and an observing face provided at a side opposite to the light emitting face; and
   light diffusing means for diffusing light, provided on a side of the observing face with respect to the illuminating object,
   wherein light introduced from the light inlet face is diffused at the light diffusing means and led to the illumination object to emit through the illumination object face; and
a license plate disposed such that an indication face of the license plate is opposed to a side of the light emitting face of the planar lighting unit.

* * * * *